United States Patent [19]
Murray et al.

[11] Patent Number: 6,094,095
[45] Date of Patent: Jul. 25, 2000

[54] EFFICIENT PUMP FOR GENERATING VOLTAGES ABOVE AND/OR BELOW OPERATING VOLTAGES

[75] Inventors: Kenelm Murray; Morgan Whately, both of Sunnyvale, Calif.

[73] Assignee: Cypress Semiconductor Corp., San Jose, Calif.

[21] Appl. No.: 09/106,808

[22] Filed: Jun. 29, 1998

[51] Int. Cl.[7] .................................................. H03K 3/01
[52] U.S. Cl. ............................. 327/589; 327/530; 363/59
[58] Field of Search .................................. 327/530, 536, 327/537, 589; 307/49, 110; 363/59, 60

[56] References Cited

U.S. PATENT DOCUMENTS

| | | | |
|---|---|---|---|
| 4,897,774 | 1/1990 | Bingham et al. | 307/110 |
| 4,935,644 | 6/1990 | Tsujimoto | 307/296.2 |
| 5,059,815 | 10/1991 | Bill et al. | 307/246 |
| 5,276,646 | 1/1994 | Kim et al. | 365/189.09 |
| 5,311,480 | 5/1994 | Schreck | 365/230.06 |
| 5,319,604 | 6/1994 | Imondi et al. | 365/230.06 |
| 5,371,705 | 12/1994 | Nakayama et al. | 365/189.09 |
| 5,438,542 | 8/1995 | Atsumi et al. | 365/182 |
| 5,461,557 | 10/1995 | Tamagawa | 307/110 |
| 5,592,430 | 1/1997 | Ohtsuki | 365/226 |
| 5,600,551 | 2/1997 | Luscher, Jr. | 307/110 |
| 5,701,272 | 12/1997 | Brennan, Jr. | 365/230.06 |
| 5,757,228 | 5/1998 | Furutani | 327/536 |
| 5,761,058 | 6/1998 | Kanda et al. | 307/110 |
| 5,767,735 | 6/1998 | Javanifard et al. | 327/536 |
| 5,796,656 | 8/1998 | Kowshik et al. | 365/185.23 |
| 5,812,459 | 9/1998 | Atsumi et al. | 365/185.23 |
| 5,841,696 | 11/1998 | Chen et al. | 365/185.11 |
| 5,889,664 | 3/1999 | Oh | 327/536 |

OTHER PUBLICATIONS

IEEE JSSC, vol. 33, No. 1, Jan., 1998, Internal Voltage Generator for Low Voltage Quarter–Micrometer Flash Memories, T. Kawahara, et al.

IEEE JSSC, vol. 32, No. 8, Aug. 1997, "Circuit Techniques for 1.5V Power Supply Flash Memory", N. Otsuka and M. Horowitz.

IEEE JSSC, vol. 31, No. 11, Nov. 1996, "Bit–Line Clamped Sensing Multiplex and Accurate High Voltage Generator for Quarter–Micron Flash Memories", T. Kawahara, et al.

IEEE JSSC, vol. 27, No. 11, Nov. 1992, A 5V–only 16Mb Flash Memory with Sector Erase Mode, T. Jinbo et al.

IEEE JSSC, vol. 27, No. 11, Nov. 1992, A 5V–only Operation 0.6–βm Flash EEPROM with Row Decoder Scheme in Triple–Well Structure, A. Umezawa, et al.

"Non–Volatile Semiconductor Memories, Technologies, Design and Applications", IEEE Press, Ed Chenming Hu, 1991.

IEEE JSSC, vol. 24, No. 5, Oct. 1989, "Analysis and Modeling of On–Chip High–Voltage Generator Circuits for Use in EEPROM Circuits", Witters, et al.

IEEE JSSC, vol. 32, No. 6, Jun. 1997, "Efficiency Improvement in Charge Pump Circuits", Wang et al.

IEEE JSSC, vol. 32, No. 1, Jan. 1997, "Program Load Adaptive Voltage Generator for Flash Memories", Fiocchi, et al.

IEEE JSSC, vol. SC–18, No. 5, Oct. 1983, "Control Logic and Cell Design for a 4K NVRAM", Lee, et al.

IEEE JSSC, vol. SC–18, No. 5, Oct. 1983, "High–Voltage Regulation and Process Considerations for High–Density 5V–only E$^2$PROM's", Oto, et al.

IEEE JSSC, vol. SC–11, No. 4, Jun. 1976, "On–Chip High–Voltage Generation in NMOS Integrated Circuits Using an Improved Voltage Multiplier Technique", John F. Dickson.

*Primary Examiner*—Jung Ho Kim
*Attorney, Agent, or Firm*—Christopher P. Maiorana, P.C.

[57] ABSTRACT

A method and apparatus comprising a first circuit configured to generate a first output in response to a first input, a second circuit configured to present a second output in response to a second input, and a third circuit configured to generate a first voltage signal and a second voltage signal in response to the first output and said second output. The first voltage signal may be above the positive supply and the second voltage signal may be below the negative supply.

18 Claims, 6 Drawing Sheets

BOOT-STRAP CIRCUIT
FIG. 1A

CHARGING
FIG. 1B

CHARGED
FIG. 1C

FIG. 1D BOOT-STRAP POSITIVE

FIG. 1E BOOT-STRAP NEGATIVE

EFFICIENT PUMP FOR GENERATING VOLTAGES ABOVE AND/OR BELOW OPERATING VOLTAGES

FIELD OF THE INVENTION

The present invention relates to charge pumps generally and, more particularly, to a charge pump for generating voltages above and/or below operating voltages of a memory device.

BACKGROUND OF THE INVENTION

Conventional approaches to high voltage generation (both positive and negative) implement discrete pumps for each of the positive and negative requirements on a particular integrated circuit device. These separate pumps typically operate separately for erasing and programming. On-chip high voltage pumps based on simple voltage doubler techniques often suffer from inefficiencies due to body bias effects. These on-chip voltage requirements are typically in the +16v and −10v region. In multi-stage pumps, the latter stages are often transferring charge within MOS transistors under conditions of heavy body bias. This may result in the voltage increments produced by each of the stages tailing off significantly as the high voltages are reached. Specifically, and by way of example, in a conventional CMOS twin-well process with a P-substrate, only P-channel transistors can be used for negative voltage generation (<VSS), otherwise forward-biased diodes would result. Consequently, the less the end-voltage (in relation to chip supplies) the more efficient the pump.

SUMMARY OF THE INVENTION

The present invention concerns a method and apparatus comprising a first circuit configured to generate a first output in response to a first input, a second circuit configured to present a second output in response to a second input, and a third circuit configured to generate a first voltage signal and a second voltage signal in response to the first output and said second output. The first voltage signal may be above the positive supply and the second voltage signal may be below the negative supply.

The objects, features and advantages of the present invention include providing a charge pump that generates (i) both positive or negative voltages on a circuit, (ii) positive or negative voltages that can be off-set as required to minimize the overall circuit size, (iii) a high positive voltage and the simultaneous availability of a range of negative voltages outside the operating supply voltages (VCC and VSS), (iv) a high negative voltage and the simultaneous availability of a range of positive voltage outside the operating supply voltages, (v) a circuit that allows for control of the very high positive voltage or very high negative voltage by control of the boot-strap supply inputs and (vi) a high voltage boot-strapped circuit in which the boot-strap transistors are less prone to snap-back effects since they are only switched at low source/drain voltages. The present invention may be particularly useful for low supply voltages as this method generates voltages from two pumps that are not required to generate the full high voltage levels. Additionally, if only a single low threshold voltage transistor is available in the process, it may be possible to generate the majority of the voltage in one direction and only a small amount in the other. When these voltages are bootstrapped together, the required high positive and high negative voltages may be achieved.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1A:
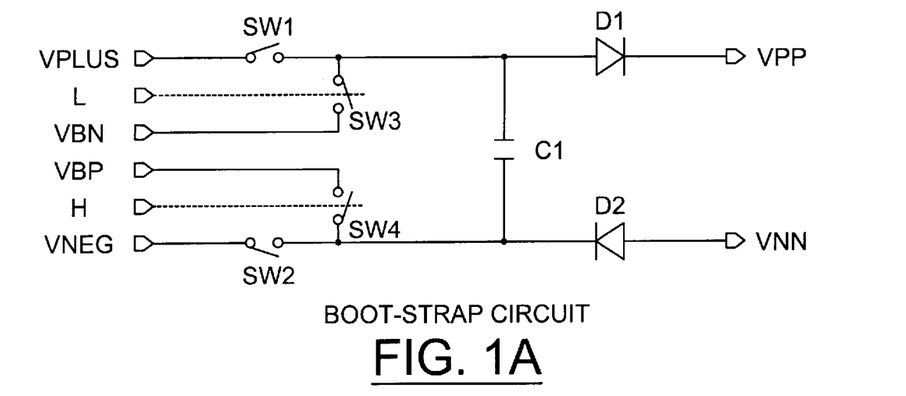
FIGS. 1A–1E are simplified conceptual diagrams of the circuit illustrating operation of the present invention.

FIG. 1A illustrates the present invention at the most basic level circuit comprising a boot-strap capacitor C1, a diode D1, a diode D2, and a switching circuit SW1–SW4. The signals Vplus and Vneg are the input voltage nodes. L and H are input signals which control the direction of the bootstrap. Vbp and Vbn are input voltage nodes which control the extent of the boot-strap.

Figure 1B:
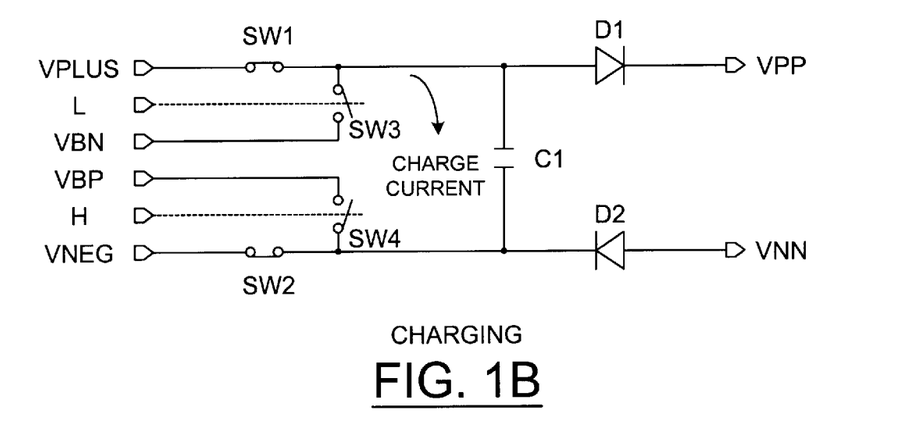
Figure 1C:
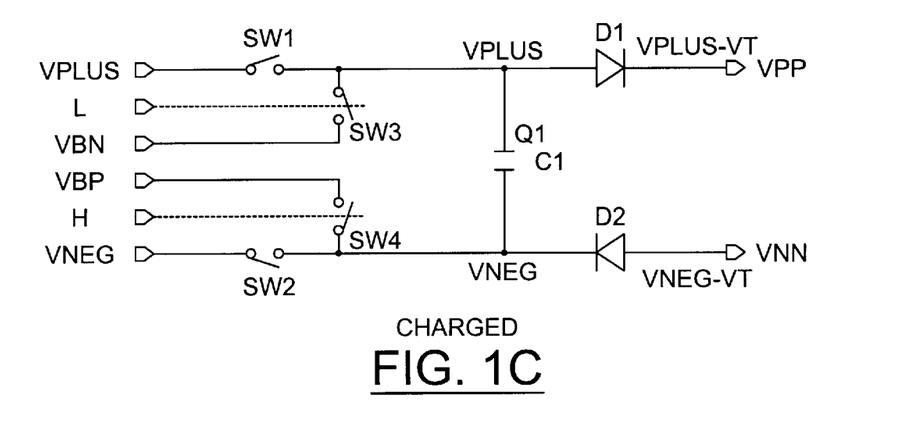

Referring to FIG. 1B, when the switches SW1 and SW2 are closed, while the switches SW3 and SW4 remain open, the capacitor C1 begins charging. When the capacitor C1 is fully charged (as shown in FIG. 1C), the switches SW1 and SW2 are opened. The voltage across the capacitor C1 may be Vplus+|Vneg|. At this stage the nodes VPP and VNN are charged up to voltage Vplus−Vt and Vneg+|Vt| respectively.

The capacitor C1 stores a charge Q1, which can be boot-strapped in either the positive or negative direction. The signals L and H control switches SW3 and SW4, respectively.

Figure 1D:
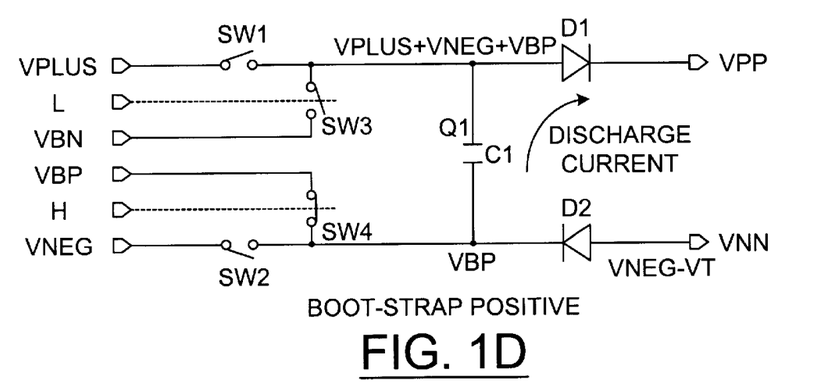

Referring to FIG. 1D, if a circuit is to be bootstrapped in the positive direction, the switch SW4 is closed. The voltage on the bottom plate of the capacitor is now Vbp. Since the capacitor C1 still has charge Q1 stored on it, the voltage on the top plate is raised by the change in voltage of the bottom plate.

If a load exists a charge transfer will occur through the diode D1. The capacitor C1 will discharge into this load. When the charge transfer is completed switch SW4 is opened, and the charging process can be repeated.

Figure 1E:
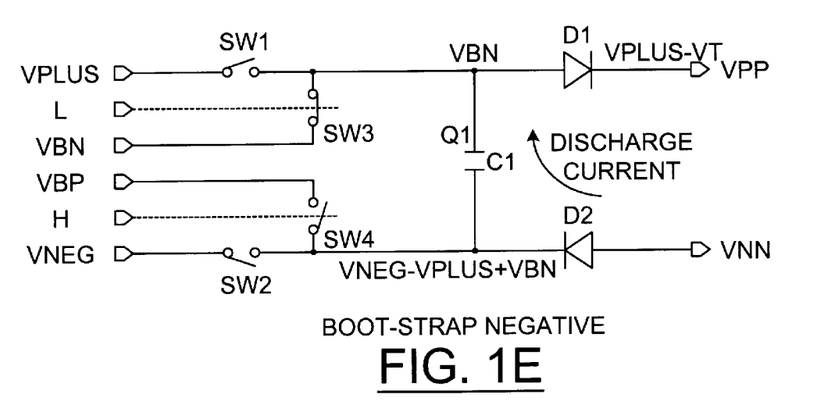
Figure 2:
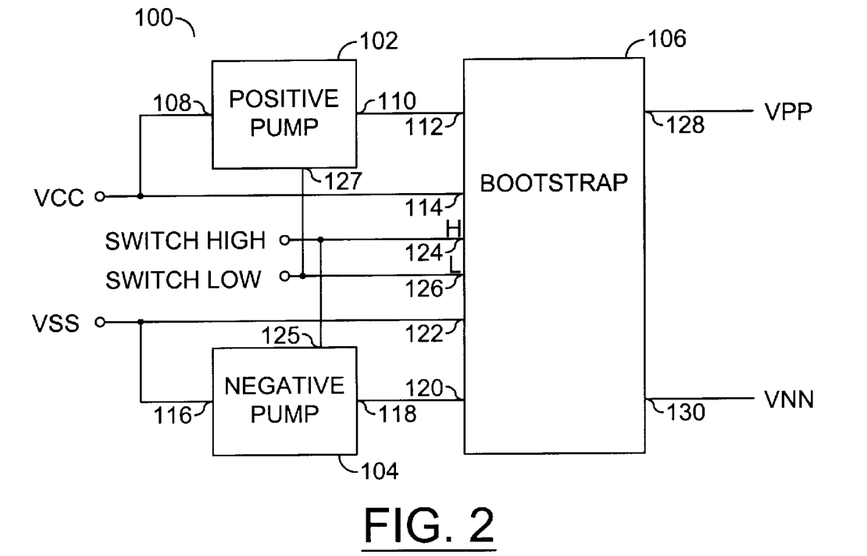
FIG. 2 is a block diagram of an embodiment of the present invention.

Referring to FIG. 1E, the bootstrap in the negative direction operates on the same principles. After the capacitor C1 has charged up, the switch SW3 is closed, resulting in the top plate of the capacitor C1 being pulled down to Vbn. The bottom plate will follow in order to maintain the same potential across the capacitor C1.

When bootstrapping in the positive direction or in the negative direction a number of charge transfers are required before the final output voltage is reached. The number is dependent on the ratio of the bootstrap capacitor C1 to the load capacitor. If the circuit is required to deliver a DC current on account of an additional resistive load, the bootstrap circuit is required to top-up the load capacitance at every cycle. By using an interleaved bootstrapping scheme, i.e. bootstrapping in one direction followed by the other, it is possible to generate both a very high positive and a very high negative voltage at the same time.

Figure 3:
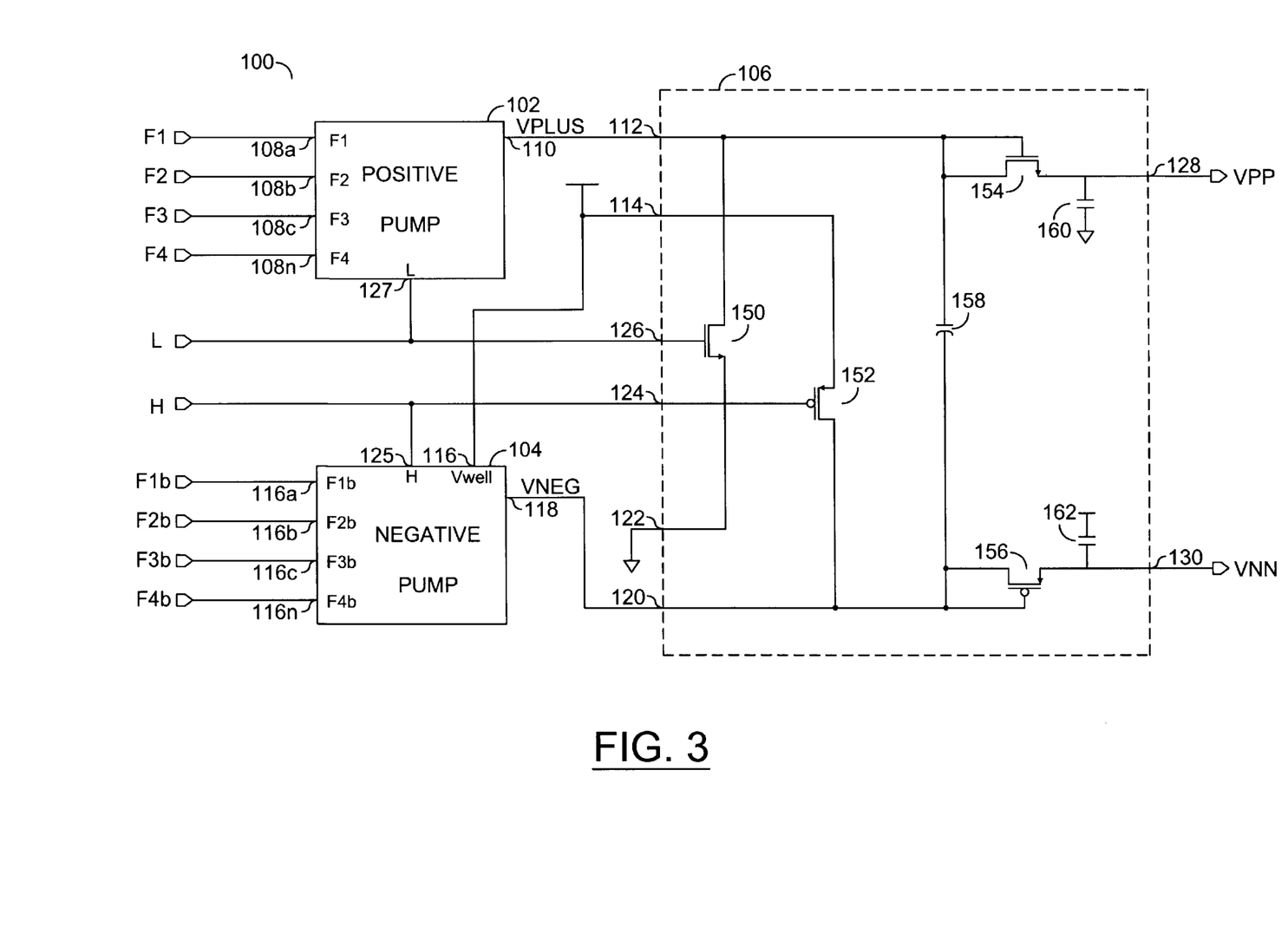
FIG. 3 is a more detailed circuit diagram of an embodiment of the present invention.

Referring to FIG. 3, a block diagram of a circuit 100 is shown in accordance with an embodiment of the present invention. The circuit 100 generally comprises a positive pump 102, a negative pump 104 and a boot strap block (or circuit) 106. The positive pump 102 has an input 108 that may receive an input supply voltage (e.g., VCC) and an output 110 that may present a signal to an input 112 of the boot strap circuit 106. The supply voltage VCC may also be presented to an input 114 of the boot strap circuit 106. The negative pump 104 has an input 116 that may receive a ground (e.g., OV) and an output 118 that may present a signal to an input 120 of the boot strap circuit 106. The ground VSS may also be presented to an input 122 of the boot strap circuit 106. The boot strap circuit 106 may also have an input 124 that may receive a switch high signal (e.g., H) and an input 126 that may receive a switch low signal (e.g., L). The switch high signal may also be presented to an input 125 of the negative pump 104 and the switch low signal may also be presented to an input 127 of the positive pump 102. The boot strap circuit 106 may also comprise an output 128 that may present a signal VPP and an output 130 that may present a signal VNN.

The positive pump 102 may be implemented as an N-channel pump. Additionally, the positive pump 102 may be implemented as a multi-phase pump (e.g., four phases). Similarly, the negative pump 104 may comprise a P-channel pump. For example, the negative pump 104 may be implemented as a four-phase negative pump. To implement the positive pump 102, a number of N-channel transistors may be used (to be described in more detail in connection with FIG. 4). To implement the negative pump 104, a number of P-channel transistors may be implemented (to be described in more detail in connection with FIG. 5). The positive pump 102 and the negative pump 104 are shown as examples of circuits used to generate a high positive and a low negative voltage, respectively. Other examples may be implemented, such as a positive reference voltage along with a negative pump, a negative voltage along with the positive pump or an externally generated positive and negative voltage. In this invention the voltages Vplus and Vneg may be generated from two pumps which may operate together or operate individually. One of these pumps usually generates in the positive direction while the other pump usually generates in the negative direction. Each pump is not required to generate the full program/erase voltages but only a intermediate voltage. The bootstrap circuit is then used to generate the high positive or high negative voltages. In non-volatile memory applications, these high positive and high negative voltages are not required to deliver large amounts of current. Along with the high positive and high negative voltages a range of intermediate positive and negative voltages may be also available.

Referring to FIG. 3, a more detailed diagram of the circuit 100 is shown. The positive pump 102 is shown having a number of inputs 108a–108n, representing a multi-phase input. The input 108a may receive a first oscillating input F1, the input 108b may receive a second oscillating input F1, the input 108c may receive a third oscillating input F3 and the input 108n may receive a fourth oscillating input F4. The number of inputs 108a–108n may be adjusted accordingly to meet the design criteria of a particular implementation. The pump 102 is shown presenting a signal (e.g., Vplus) at the output 110 that may be received at the input 112 of the boot strap circuit 106.

The negative pump 104 is shown having an input 116 a that may receive a complement signal (e.g., F1b) of the signal received at the input 108a, input 116b that may receive a complement signal (e.g., F1b) of the signal received at the input 108b, an input 116c that may receive a complement signal (e.g., F3b) of the signal received at the input 108c, and an input 116 n that may receive a complement signal (e.g., F4b) of the signal received at the input 108n. However, the signals presented to the inputs 116a–116n may not necessarily be required to be complement signals of the signals presented to the inputs 10a–108n in certain design implementations.

The boot strap circuit 106 further comprises a transistor 150, a transistor 152, a transistor 154, a transistor 156, and a capacitor 158. A capacitor 160 and a capacitor 162 may represent the parasitic capacitance at the outputs 128 and 130, respectively. The transistor 150 generally comprises a gate that may receive the signal L from the input 126, a source that may be coupled to ground and a drain that may be coupled to the input 112. The transistor 152 generally has a gate that may receive the signal H from the input 124, a drain that may be connected to the input 120, and a source that may be connected to a supply voltage. The transistors 154 and 156 are generally configured as diodes. For example, the transistor 154 generally has a gate and a source that may be connected to the input 112 and to a first side of a capacitor 158. The drain of the transistor 154 generally presents the signal VPP at the output 128. The transistor 156 has a gate and a source that may be coupled to the input 120 and a second side of the capacitor 158. The drain of the transistor 156 is generally presented to the output 130. The parasitic capacitance 160 is generally coupled between the output 128 and ground. The parasitic capacitance 162 is generally coupled between the output 130 and the supply voltage.

The capacitor 158 may be charged both positively and negatively at the same time through the positive pump 102 and the negative pump 104, respectively. The transistors 150 and 152 may be implemented as high-voltage switch transistors. The transistors 150 and 152 generally begin operation in an off state. The voltage is Vplus may be charged to an intermediate positive high-voltage (e.g., +8v) and the voltage Vneg may be charged to an intermediate negative high-voltage (e.g., −8v). The outputs of the positive pump 102 and the negative pump 104 may then be turned off (to be described in more detail in connection with FIG. 6). Next, either the transistor 150 or 152 may be turned on. If the transistor 152 is turned on, then the voltage Vplus may be boot strapped toward a full high-positive voltage (e.g., +15v). If the transistor 150 is turned on, then the voltage Vneg may be boot strapped toward a full high-negative voltage (e.g., −15v). The diode-mode transistors 154 and 156 may pass a charge to create the pull up signal (e.g., VPP) or the pull down signal (e.g., VNN), respectively. Charge sharing may take place with the load parasitic capacitances 160 and 162, respectively. The voltage VPP or VNN may step-up in voltage toward Vplus or Vneg, respectively, by an amount dependent on this charge sharing. The "diode" drop in the transistor 154 may cause the voltage VPP to be slightly (e.g., Vth) less positive than the To voltage Vplus. Similarly, the voltage VNN is generally slightly less negative than the voltage Vneg because of the "diode" drop in the transistor 156.

The charging cycle may then be repeated with both the transistors 150 and 152 turned off and both of the pumps 102 and 104 active. This generally causes the capacitor 158 to begin recharging. The number of cycles needed to provide the output voltages VPP and VNN will depend on the level of the supply voltage VCC, the capability of the positive and negative pumps 102 and 104, the ratio of the size of the capacitor 158 to the size of the parasitic capacitances 160 and 162 and the targeted final voltage requirements of the voltages VPP or VNN. Operating voltages in typical integrated circuits such as microprocessors, logic devices or memories (e.g., an SRAM) may have a 1.8–5v range of operation. Other battery-powered applications may have external supply voltages ranging from 0.9v to about 3v, which is typically less than the operating voltage VCC. Regulation of the high output voltages may be accomplished using conventional methods. The high voltage ramp control during charge and final discharge of the high voltage output may also be accomplished according to conventional methods.

When a high-negative voltage is being generated at the output VNN, through boot strapping with input L, the positive pump 102 may also be maintaining an intermediate positive voltage at Vpp, which is generally the un-bootstrapped Vplus minus the "diode" drop in the transistor 154. The intermediate positive voltage may be greater than the supply voltage VCC and may be required to be generated at the same time. For example, when a −10v voltage is used in programming (e.g., VNN), it may be necessary to supply +6 volts at the same time at the output VPP. This may also be true when the high positive voltage is being generated at the output VPP, through boot strapping with inputs where the negative pump 104 may also be maintaining an intermediate negative voltage, at Vnn, which is generally the unboot strapped Vneg minus the "diode" drop in the transistor 156. The intermediate negative voltage may be more negative than the ground supply, Vss, and may be required to be generated at the same time.

Figure 4:
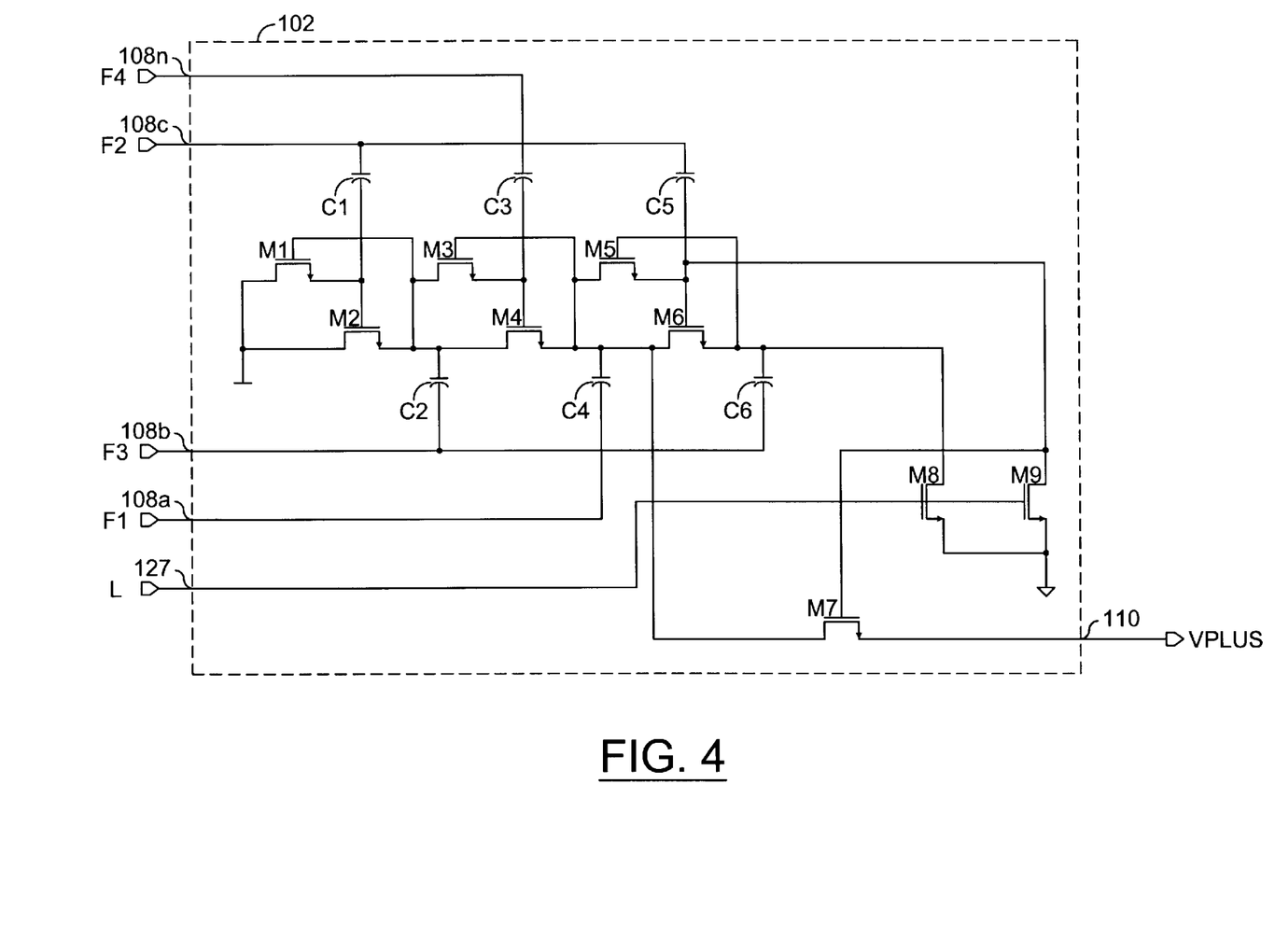
FIG. 4 is a circuit diagram of a four-phase positive pump.

Referring to FIG. 4, a circuit diagram of one example of a four-phase positive pump 102 is shown. The pump 102 comprises a capacitor C1, capacitor C2, capacitor C3, capacitor C4, capacitor CS, capacitor C6, a transistor M1, a transistor M2, a transistor M3, a transistor M4, a transistor M5, a transistor M6, a transistor M7, a transistor MS, and a transistor M9. The transistor M1 has a source that may be coupled to ground. The gate of the transistor M1 is generally coupled to the drain of the transistor M2, the source of the transistor M3, the source of transistor M4 and a first side of the capacitor C2. A second side of the capacitor C2 is generally coupled to the input 108c. The drain of the transistor M1 is generally coupled to the gate of the transistor M2 as well as to a first side of the capacitor C1. A second side of the capacitor C1 is generally coupled to the input 108b. The input 108b is also coupled to a first side of the capacitor C5. The input 108 n is generally coupled to a first side of the capacitor C3. The input 108c is generally coupled to a second side of the capacitor C2 and the capacitor C6. The transistors M3, M4, M5 and M6 are generally configured in a similar fashion to the transistors M1 and M2. The transistors M7, MB and M9 generally provide output isolation.

Figure 5:
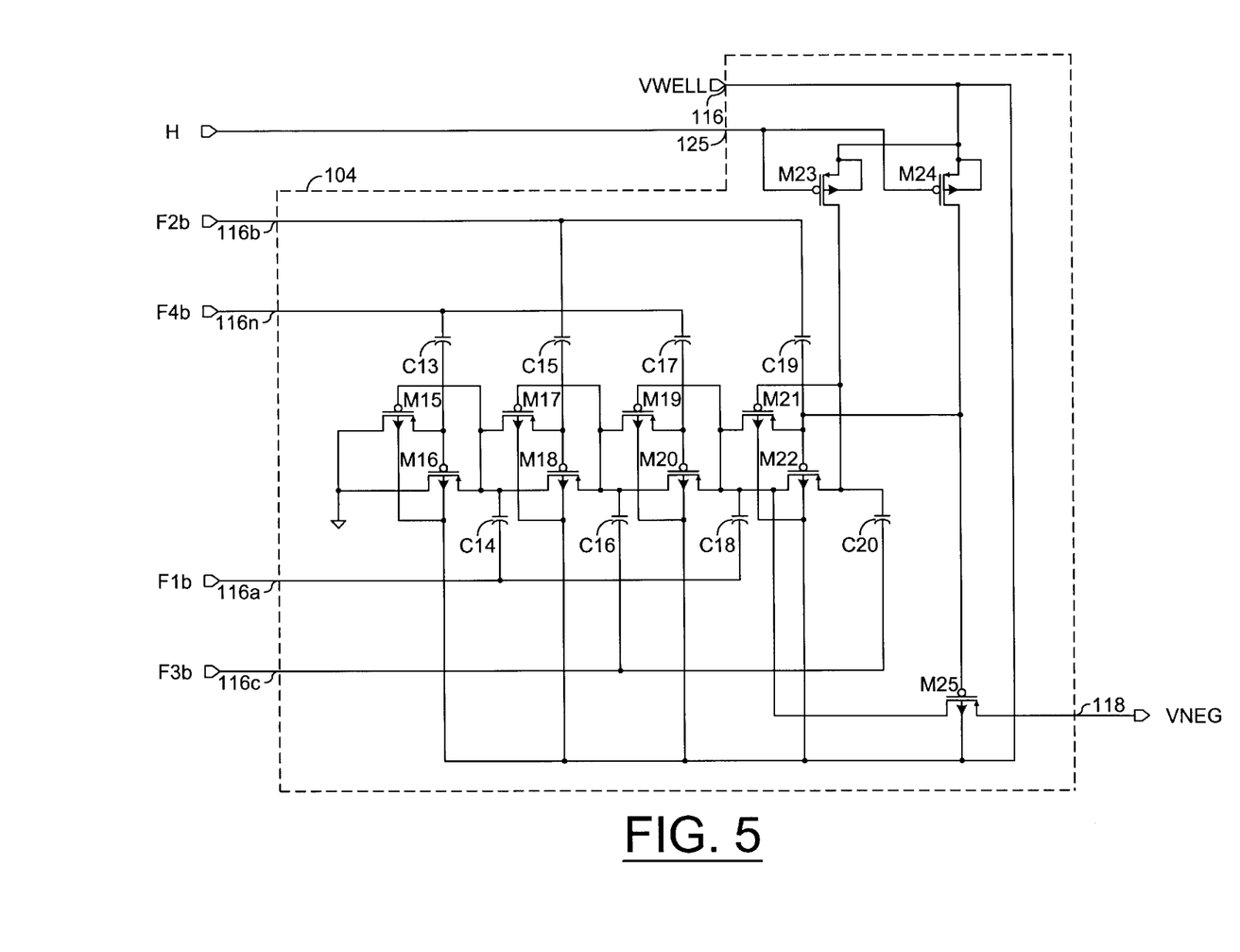
FIG. 5 is a circuit diagram of a four-phase negative pump.

Referring to FIG. 5, a more detailed diagram of an example of a four-phase negative pump 104 is shown. The pump 104 generally comprises a capacitor C13, a capacitor C14, a capacitor C15, a capacitor C16, a capacitor C17, a capacitor C18, a capacitor C19, and a capacitor C20, a transistor M15, a transistor M16, a transistor M17, a transistor M18, a transistor M 19, a transistor M20, a transistor M21, a transistor M22, a transistor M23, a transistor M24 and a transistor M25. The transistors M15–M22 are coupled in a similar fashion as the transistors M1–M6 shown in FIG. 4. However, the transistors M15–M22 are generally P-channel transistors. Additionally, the sources of the transistors M15 and M16 are generally coupled to ground.

Figure 6:
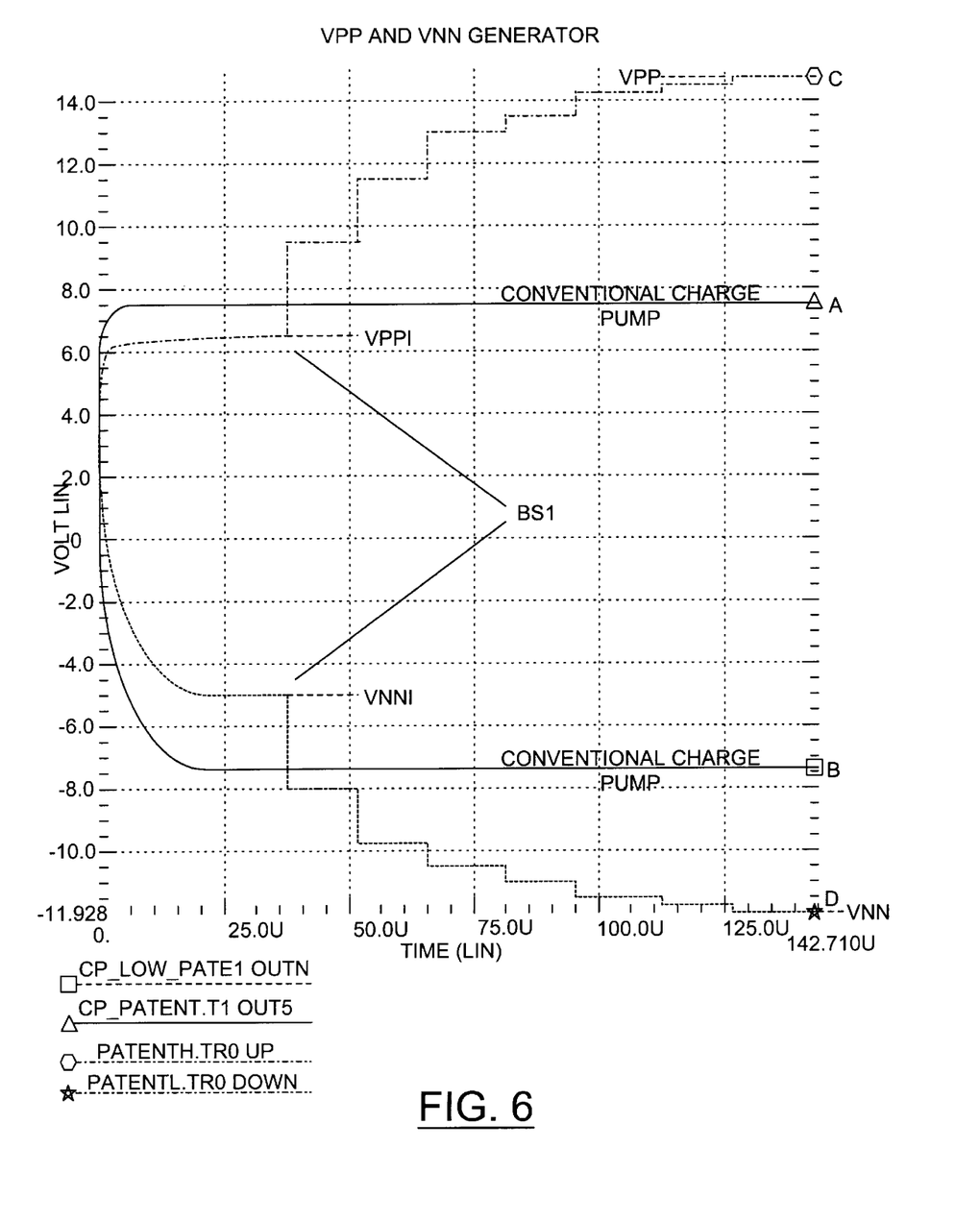
FIG. 6 is a plot illustrating the operation of the pump of the circuit of FIG. 2 compared to conventional pumps.

Referring to FIG. 6, a graph of the outputs of the present invention is shown. The negative curves marked b and d have been superimposed on the same graph as the positive curves a and c for the purposes of comparison and explanation. In general, only one set of curves occurs at a given time. The curves a and b show the voltage generated from a typical four-phase positive and negative pump, respectively. These voltages are seen rising asymptotically to a poor high and a poor negative voltage respectively. The boot strap function, caused by the circuit 106, is shown in the curves c and d, respectively. A far higher voltage then shown may be obtained, in time, from the same pumps. A point BS1 is where the first boot strap occurs. The curves c and d initially start at a lower voltage level due to the diode effect of the transistors 154 and 156, respectively. However, the voltage levels of the curves c and d quickly pass the voltage levels of the curves a and b. Since neither the pump 102 nor the pump 104 have to produce very high voltages, the overall size of the pumps may be reduced.

The operation of the circuit 100 may be shown by the following example. If the diode drops across the transistors 154 and 156 is 1.4v each, the supply voltage is 1.7v and an erase required voltage Vpp is 16v, each pump (e.g., 102 and 104) must generally deliver the voltage out in accordance with the following equations EQ1:

$$\text{EQ1 OUT}=(16v+1.4v-1.7v-1.7v)/2$$

This 7v is required on Vplus and Vneg outside the supplies in the form Vcc+7v and Vss −7v respectively. A positive pump target may be VCC+7v, or 8.7v. A negative pump target may be −7v. Therefore, the final voltage across the capacitor 158 may be approximately 15.7v. The switch 150 can boot strap the final program voltage VNN to −14.3v. The switch 152 may boot strap the final erase voltage VPP to +16v.

The operation of the bootstrap circuit driving a capacitive load can be explained by the following equations EQ2 and EQ3:

$$\text{EQ2 Vpp}=\text{Vplus}-\text{Vtn}+|\text{Vneg}|+\text{Vbp}$$

and the high negative voltage reaches $$\text{EQ3 Vnn}=\text{Vneg}-\text{Vplus}+\text{Vbn}+|\text{Vtp}|$$

where Vtn and Vtp are the N-channel and P-channel threshold voltages, respectively.

In the above numeric example the voltages Vbp and Vbn are made the same as the supplies Vcc (1.7v) and Vss (0v), respectively. The output voltage may be adjusted by the bootstrap voltages Vbp and Vbn.

An additional implementation may be developed from the same basic idea by dropping the two diode structures 154 and 156 and significantly increasing the value of the boot strap capacitor 158. Only one boot strap action may be required, when the positive or negative pumps (e.g., 102 and 104) have achieved their final values, and the high voltages may be supported by the charge across the boot strap capacitor 158. The switch circuits may be required to route the high positive or high negative to the load.

Referring back to FIGS. 1A–1E, the conceptual diagram of the operation of the circuit 100 will be described in more detail. A switch SW1 and a switch SW2 have been added to illustrate the disconnecting of the charge pumps 102 and 104 at different times in the charging of the capacitor 158. The switches SW1 and SW2 may be incorporated into the respective charge pumps 102 and 104, respectively. The switch SW3 generally corresponds to the transistor 150 and the switch SW4 generally corresponds to the transistor 152. When the switches SW1 and SW2 are closed, while the switches SW3 and SW4 remain open, the capacitor 158 begins charging. When the capacitor 158 is charged, the switches SW1 and SW2 are opened. The voltage across the capacitor may be Vplus+|Vneg|. At this stage, the nodes VPP and VNN are charged up to the voltage Vplus−Vt and Vneg+|Vt|, respectively.

After the boot strap capacitor 158 is charged, it can be boot strapped in either the positive or the negative direction. The signals L and H may control the switches SW3 and SW4, respectively. If the circuit 100 is to be boot strapped in the positive direction, the switches SW4 is generally closed. The voltage on the bottom plate of the capacitor 158 may now be at a positive supply or positive Vbp. Since the capacitor 158 still has a charge Q1 stored on it, the voltage on the top plate may be raised by the change in the voltage of the bottom plate.

When generating high positive voltages, if a load exists, a charge transfer may occur through the diode D1 (represented by the transistor 154 in FIG. 3). The capacitor 158 will discharge into this load. When the charge transfer is completed, the switch SW4 may be opened, and the charging process can be repeated.

A boot strap in the negative direction may operate in the same general principle. After the capacitor 158 is charged up, the switch SW3 may be closed, which may result in the top plate of the capacitor being pulled down to a ground or negative supply voltage Vbn. The bottom plate will follow in order to maintain the same potential across the capacitor 158. If a load exists, a charge transfer may occur through the diode D2 (represented by the transistor 156 in FIG. 3). The capacitor 158 will discharge into this load. When the charge transfer is completed, the switch SW3 may be opened and the charging process can be repeated. When generating high positive voltages or high negative voltages, a number of charge transfers may be required before the final output voltage is reached. The number of transfers may be dependent on the ratio of the boot strap capacitor 158 to the load capacitances 160 and 162. If the circuit 100 is required to deliver a DC current, on account of an additional resistor load, the boot strap circuit may be required to top off the load capacitance at every cycle.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
 a first circuit comprising a positive pump including a first control input, said first circuit configured to generate a first output in response to a first input, wherein said first circuit comprises a first switch configured to turn on and off said first output;
 a second circuit comprising a negative pump including a second control input, said second circuit configured to generate a second output in response to a second input, wherein said second circuit comprises a second switch configured to turn on and off said second output; and
 a third circuit configured to generate a first voltage signal and a second voltage signal in response to (i) said first output and (ii) said second output, wherein said third circuit comprises a capacitor coupled between said first output and said second output.

2. The circuit according to claim 1, wherein said first circuit is configured to generate said first output in further response to a first control signal and said second circuit is configured to generate said second output in further response to a second control signal.

3. The circuit according to claim 2, wherein said third circuit presents said first voltage signal and said second voltage signal in further response to a third control signal.

4. The circuit according to claim 3, wherein said third circuit presents said first voltage signal and said second voltage signal in further response to a fourth control signal.

5. The circuit according to claim 1, wherein:
 said first circuit comprises an N-channel positive pump; and
 said second circuit comprises a P-channel negative pump.

6. The circuit according to claim 5, wherein said N-channel positive pump comprises a plurality of N-channel MOS transistors and said P-channel negative pump comprises a plurality of P-channel MOS transistors.

7. The circuit according to claim 4, wherein said third circuit generates a portion of said first voltage signal and said second voltage signal at one time in response to said third and fourth control signals.

8. The circuit according to claim 4, wherein said third circuit simultaneously generates a portion of said second voltage signal and said first voltage signal in response to said third and fourth control signals.

9. The circuit according to claim 1, wherein said first switch comprises a P-channel transistor and said second switch comprises an N-channel transistor.

10. The circuit according to claim 1, wherein said third circuit further comprises a first diode and a second diode.

11. The circuit according to claim 10, wherein said first diode comprises a P-channel transistor and a second diode comprises an N-channel transistor.

12. A circuit comprising:
 means for generating a first output in response to a first input, said means for generating said first output comprising (i) a first switch for turning on and off said first output and (ii) a positive pump including a first control input;
 means for generating a second output in response to a second input, said means for generating said second output comprising (i) a second switch for turning on and off said second output and (ii) a negative pump including a second control input; and
 means for generating a first voltage signal and a second voltage signal in response to (i) said first output and (ii) said second output, said means for generating said first and second voltage signals comprising a capacitor coupled between said first output and said second output.

13. A method for generating a first and a second voltage signal comprising the steps of:
 (A) generating a first output by turning a first switch on and/or off, wherein step (A) comprises generating said first output with a positive pump in response to a first output control signal;
 (B) generating a second output by turning a second switch on and/or off, wherein step (B) comprises generating said second output with a negative pump in response to a second output control signal; and
 (C) generating said first voltage signal and said second voltage signal in response to (i) said first output and (ii) said second output, a capacitor being coupled between said first output and said second output.

14. The method according to claim 13, wherein step (C) comprises generating said first output and said second output in further response to a first control signal and a second control signal.

15. The method according to claim 14, wherein step (C) comprises generating said first output and said second output in further response to a second control signal.

16. The method according to claim 13, wherein said positive pump comprises an N-channel positive pump responsive to said first output control signal and said negative pump comprises a P-channel negative pump responsive to said second output control signal.

17. The method according to claim 13, wherein step (C) comprises generating either said first voltage signal or said second voltage signal at a given time in response to said first and second control signals.

18. The method according to claim 15, wherein step (C) comprises simultaneously generating a portion of said first voltage signal and said second voltage signal in response to said first and second control signals.

* * * * *